UNITED STATES PATENT OFFICE.

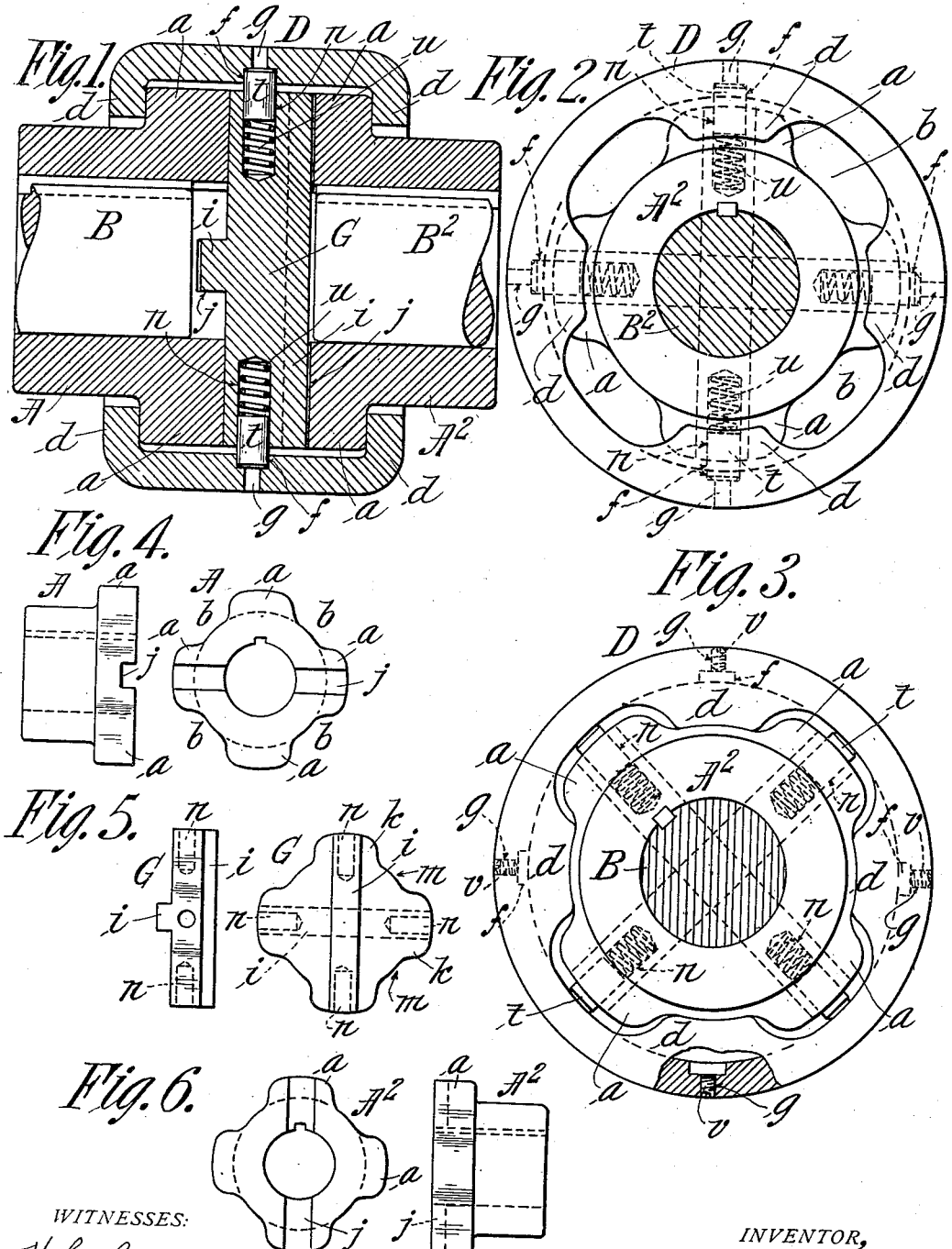

GEORGE V. CURTIS, OF SPRINGFIELD, MASSACHUSETTS, ASSIGNOR TO BAUSH MACHINE TOOL COMPANY, OF SPRINGFIELD, MASSACHUSETTS, A CORPORATION OF MASSACHUSETTS.

SHAFT FLEXIBLE COUPLING.

1,070,233.   Specification of Letters Patent.   Patented Aug. 12, 1913.

Application filed July 2, 1912. Serial No. 707,258.

*To all whom it may concern:*

Be it known that I, GEORGE V. CURTIS, a citizen of the United States of America, and resident of Springfield, in the county of Hampden and State of Massachusetts, have invented certain new and useful Improvements in Shaft Flexible Couplings, of which the following is a full, clear, and exact description.

This invention relates to a coupling for uniting the ends of two shafts which are in, or substantially in, axial alinement or in which the axes may be parallel, the axis of the one shaft being but slightly offset from the axis of the other, and of a kind permitting of a degree of flexibility to compensate for displacements of the shafts in their axial relations.

The coupling to which this invention pertains is one comprising opposed shaft connection members, a ring frame embracing and having coupling engagements with the shaft connection members, and a key block connected with the ring frame and with which the shaft connection members have slidable engagements along lines at right angles to each other.

The object of the present invention is to provide novel means permitting of the quick and convenient connection and detachment of the several parts of the coupling and one which dispenses with the employment of bolts or like fastenings, which present a rough exterior to the device and are liable to jar loose.

The invention is described in conjunction with the accompanying drawings and is set forth in the claims.

In the drawings:—Figure 1 is a central longitudinal sectional view through the coupling. Fig. 2 is an elevation of the coupling having the parts thereof engaged and connected as in use, and as seen at right angles to its axis. Fig. 3 is a view similar to Fig. 2 but showing the parts as in relations permitting of disassemblage. Figs. 4, 5 and 6 are pairs of views,—side and end face,—of the shaft connection members and the key plate.

In the drawings, A and $A^2$ represent opposed members with which shafts B and $B^2$ have rigidly affixed connections as by means of keys; and the said opposed connection members have at their inner ends radial projections $a$ $a$ with separating spaces $b$ between them.

D represents a coupling member or ring frame having opposed sets of separated inwardly extending flange-like projections $d$ $d$ with which the radial projections of the shaft connecting members are adapted to have matching relations as shown in Figs. 1 and 2. The spaces between the flange like projections $d$ $d$ of the ring frame are of sufficiently greater extent than that of the radial projections of the shaft connecting members as also clearly seen in the drawing. The ring frame at the middle thereof, and between the flange like members $d$ $d$ has two pairs of inwardly open sockets $f$ $f$, those of each pair being in axial alinement with each other and the lines of one pair being at right angles to the other; and the said ring frame also has holes $g$ $g$ of smaller diameter than that of said socket, continued from the latter to the periphery of the ring frame.

G represents the key plate, the same having at the opposite sides thereof diametrical ribs $i$ $i$ at right angles to each other which have engagements in grooves $j$ within the inner end faces of the shaft connection member,—the groove in shaft connection member A being at right angles to the one in the shaft connection member $A^2$. The key plate G has a contour as seen in face view approximately the same as that of the inner end portions of the shaft connection members, that is the body of the key plate has radial extensions $k$ $k$ with separating spaces $m$ $m$ between them. The key plate has in its radially projected portions the two pairs of sockets $n$ $n$ all in the same plane and the sockets of one pair being arranged at right angles to those of the other pair; and $t$ $t$ represent locking studs in the sockets $n$ which are engageable in the inwardly opening sockets $f$ in the ring frame. $u$ represents spiral springs, pocketed in the sockets $n$ in the key plate and reacting outwardly against the said studs to maintain them firmly seated in the ring frame sockets $f$ and endwise against the shoulders formed at the junctions of the openings $g$, of the smaller diameter, with the sockets.

This coupling is one in which, as manifest, the shaft connection sections A and $A^2$ and their shafts have a degree of flexibility in their connections, that is one of the shafts may assume an alinement offside from, but still parallel with, the other, as might transpire where the bearings for the one shaft becomes worn more than those for the other shaft as, for example, between the engine shaft and the transmission shaft in a motor truck.

As shown in Fig. 3, headless screws are sunk within and engaged in the holes $g$ in the ring frame which may be operative for inwardly forcing engagements against the locking studs.

To disassemble the coupling the locking studs will be inwardly pressed to bring their outer ends flush with the inner wall of the locking ring either by the inward turning of the screws $v$ or by the insertion of a small rod through the holes $g$, in case such screws are omitted,—whereupon the ring frame may be partially rotated to position the openings between the flange like members $b$ thereof in relation to the radial projections of the interengaged internal parts, and then by axial movements of the latter relatively to the ring frame, or vice versa, the disconnection may be made.

I claim:—

1. In a shaft coupling, in combination, shaft connection members each having spaced outwardly extending portions at its inner end, a key plate interposed between and having at the opposite sides thereof rib and groove engagements with the inner ends of the shaft connection members on lines at right angles to each other, and a ring-frame, encircling the outwardly extending portions of the shaft connection members and the interengaging key plate, and having oppositely arranged spaced inwardly projecting portions detachably engaged with the said outwardly extending portions of the shaft connection members.

2. In a shaft coupling, in combmination, shaft connection members each having spaced outwardly extending portions at its inner end, a key plate interposed between and having at the opposite sides thereof rib and groove engagements with the inner ends of the shaft connection members on lines at right angles to each other, a ring-frame, encircling the outwardly extending portions of the shaft connection members, and the interengaging key plate, and having spaced oppositely arranged inwardly projecting portions detachably engaged with the said outwardly extending portions of the shaft connection members, and means for preventing rotative movement of the ring frame relatively to the interengaged parts encircled thereby.

3. In a shaft coupling, in combination, opposed shaft connection members having separated outwardly extending projections, a ring frame having oppositely arranged sets of inwardly projecting flange-like members with spaces between such members as wide as the outwardly extending projections of the shaft connection members and with which flange like members said outwardly extending projections have matching engagements, a key plate interposed between the shaft connection members and encircled by the ring frame,—said key plate having at opposite sides thereof rib and groove engagements with the inner ends of the shaft connection members on lines at right angles to each other,—and means for detachably connecting the ring frame and key plate.

4. In a shaft coupling, in combination, opposed shaft connection members having separated outwardly extending projections, a ring frame having oppositely arranged sets of inwardly projecting flange-like members with spaces between such members as wide as the outwardly extending projections of the shaft connection members and with which flange like members said outwardly extending projections have matching engagements, a key plate interposed between the shaft connection members and encircled by the ring frame, said key plate having at opposite sides thereof rib and groove engagements with the inner ends of the shaft connection members on lines at right angles to each other,—said key plate having a socket within its edge portion and the ring frame having an inwardly opening socket therein, and an outwardly spring pressed locking stud in the key plate socket which is detachably engageable in the ring frame socket.

5. In a shaft coupling, in combination, opposed shaft connection members having separated radial projections, a ring-frame having separated inwardly projecting flange-like members with which the radial projections for the shaft connection members have matching relations, and having pairs of inwardly opening sockets therein, and also having holes of smaller diameter than said sockets, continued from the latter to the periphery of the ring-frame, a key-plate having at the opposite sides thereof, rib-and-groove engagements with the inner ends of the shaft connection members on lines at right angles to each other and having sockets in the edge portion thereof, locking studs in the key plate sockets and engageable in the sockets in the ring frame, and springs in the key plate sockets for exerting outwardly forcing actions to said studs.

6. In a shaft coupling, in combination, opposed shaft connection members having separated radial projections, a ring-frame having separated inwardly projecting flange-like members with which the radial projections for the shaft connection members have matching relations, and having pairs of inwardly opening sockets therein, and also having holes of smaller diameter than said sockets, continued from the latter to the periphery of the ring-frame, a key-plate having at the opposite sides thereof, rib-and-groove engagements with the inner ends of the shaft connection members on lines at right angles to each other and having sockets in the edge portion thereof, locking studs in the key plate sockets and engageable in the sockets in the ring frame, springs in the key plate sockets for exerting outwardly forcing actions to said studs, and screws in said holes in the ring frame operative for inwardly forcing engagements against said locking studs.

7. In a shaft coupling, in combination, opposed shaft connection members having separated radial projections, a ring-frame having separated inwardly projecting flange-like members with which the radial projections for the shaft connection members are adapted to have matching relations, and having pairs of inwardly opening sockets in lines at right angles to each other, a key-plate having at the opposite sides thereof, rib-and-groove engagements with the inner ends of the shaft connection members on lines at right angles to each other and having two pairs of sockets arranged at right angles to each other, locking studs in said sockets and engageable in the inwardly opening sockets in the ring-frame, and springs in compression in the sockets of the key-plate and reacting outwardly against said studs.

8. A shaft coupling comprising shaft connecting members a locking member located therebetween for holding the shaft sections against relative rotation, a sleeve connecting said shaft connecting members and yielding pins carried by said locking member movable outwardly toward the sleeve for holding said sleeve against rotation on said connecting members.

9. A shaft coupling comprising shaft connecting members a locking member located therebetween for holding the shaft sections against relative rotation, a sleeve connecting said shaft connecting members and yielding means carried by the locking member for holding said sleeve against rotation on said connecting members.

10. A shaft coupling comprising shaft connecting members a locking member located therebetween for holding the shaft sections against relative rotation, a sleeve connecting said shaft connecting members and yielding pins carried by the locking member for holding said sleeve against rotation on said connecting members.

11. The combination with shaft ends to be coupled, of a key to lock the shaft ends against relative rotation, means adapted to embrace the shaft ends, and yielding means carried by said key for interlocking said first means to said key.

Signed by me at Springfield, Mass., in presence of two subscribing witnesses.

GEO. V. CURTIS.

Witnesses:
G. R. DRISCOLL,
WM. S. BELLOWS.

---

Copies of this patent may be obtained for five cents each, by addressing the "Commissioner of Patents, Washington, D. C."